United States Patent [19]
Rodder

[11] Patent Number: 5,657,577
[45] Date of Patent: Aug. 19, 1997

[54] PROCESS FOR GROWING TISSUE CULTURED PLANTS

[76] Inventor: Jerome A. Rodder, 775 Sunshine Dr., Los Altos, Calif. 94024-3155

[21] Appl. No.: 561,872

[22] Filed: Nov. 22, 1995

[51] Int. Cl.$^6$ ............................................. A01G 31/00
[52] U.S. Cl. ............................................. 47/64; 47/62
[58] Field of Search ........................... 47/59, 65 F, 64, 47/61, 82, 83, 62

[56] References Cited

U.S. PATENT DOCUMENTS

| | | | |
|---|---|---|---|
| 4,180,941 | 1/1980 | Korematsu | 47/61 |
| 4,382,348 | 5/1983 | Kitsu | 47/59 |
| 4,607,454 | 8/1986 | Koike | 47/65 F |
| 5,324,657 | 6/1994 | Tanny | 47/64 |

FOREIGN PATENT DOCUMENTS

| | | | |
|---|---|---|---|
| 4-79817 | 3/1992 | Japan | 47/61 |
| 6-178625 | 6/1994 | Japan | 47/65 F |

Primary Examiner—Henry E. Raduazo
Attorney, Agent, or Firm—Christie, Parker & Hale, LLP

[57] ABSTRACT

A micropropagation method of growing plantlets in a liquid medium inside a container under sterile conditions comprises placing a rigid capillary block inside the container, in which the support block has a support region with upper and lower sides and a plurality of narrow diameter capillary holes extending through and opening to the upper and lower sides of the block's support region. The bottom side of the support block has feet that elevate the bottom side of the support region above the bottom of the container. A liquid-absorbing plant growth sheet such as filter paper rests on the upper surface of the block support region in contact with the capillary holes. A portion of the capillary block in the container is immersed in a liquid nutrient-containing solution to a level in the container above the lower side of the elevated block support region so that the capillary holes cause the liquid solution to travel by capillary action through the capillary holes continuously over time to constantly moisten the plant growth sheet and to thereby enhance growth of micropropagateable plant material such as seeds or plantlets placed in contact with the plant growth sheet.

4 Claims, 1 Drawing Sheet

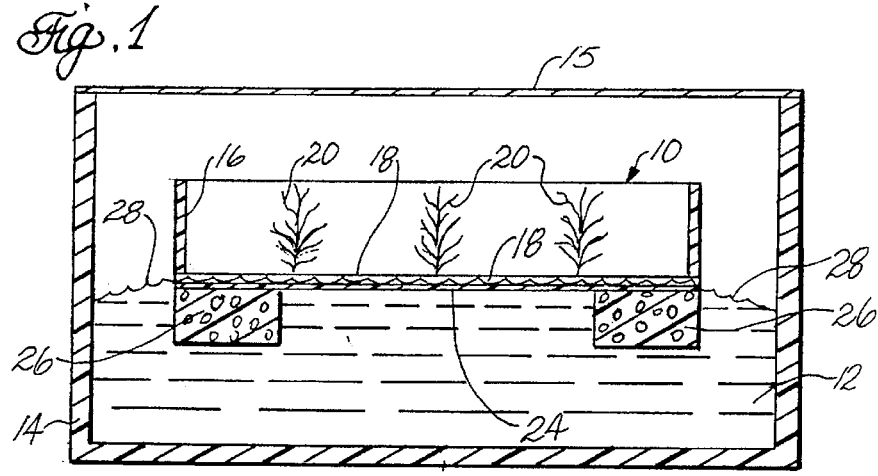
Fig. 1 — PRIOR ART
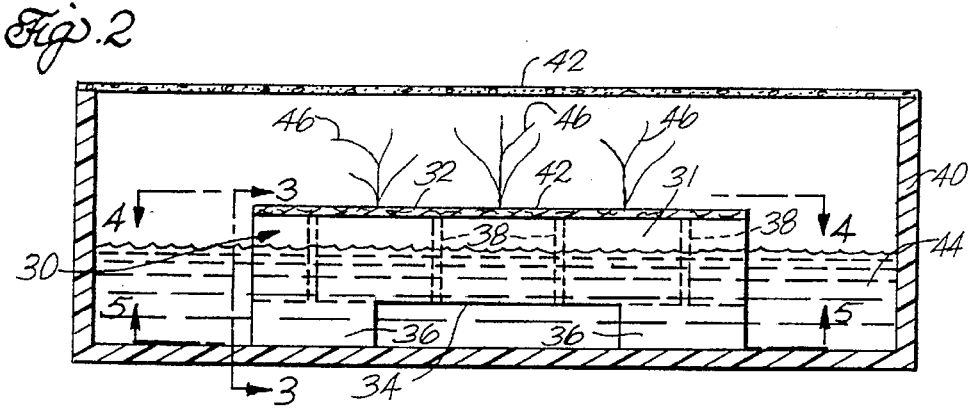
Fig. 2
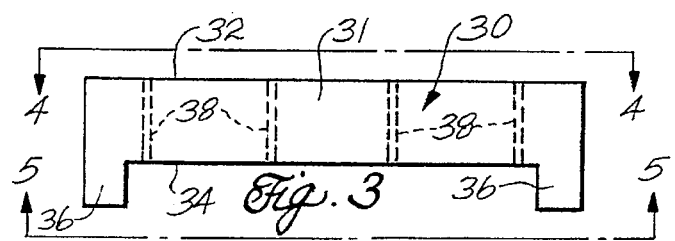
Fig. 3
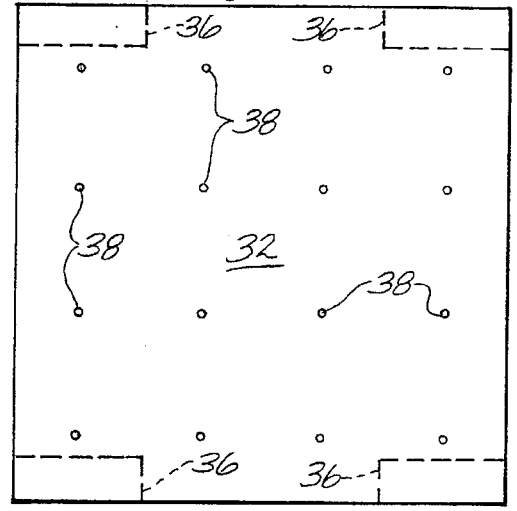
Fig. 5
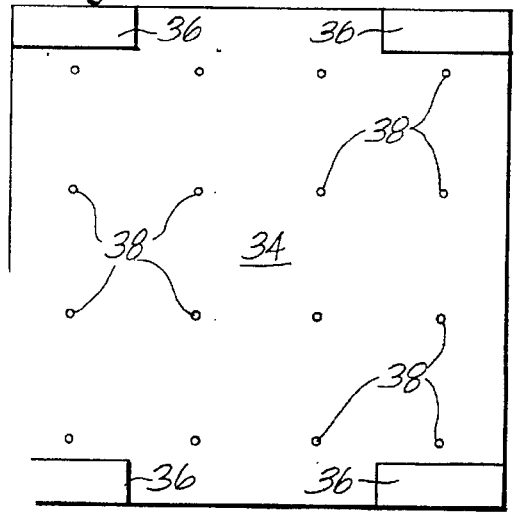
Fig. 4

PROCESS FOR GROWING TISSUE CULTURED PLANTS

FIELD OF THE INVENTION

This invention relates to plant tissue culture, and more particularly, to an improved micropropagation process of growing plantlets with liquid media.

BACKGROUND OF THE INVENTION

In the past many scoffed at the idea that tissue culture might become a competitive process for propagating nursery crops. Today the tissue culture process is widely used worldwide for plant reproduction, and millions of cultivated plants are now produced through tissue culture. With appropriate techniques, tissue cultured plants are (1) genetically like the parent plant and (2) virus free. Thus, an outstanding plant can be a parent to millions of tissue cultured clones. A few examples of tissue cultured plants include orchids, kiwi fruit, strawberries, roses, and violets.

Tissue culture has the following potential applications: (1) production of natural products, (2) genetic improvement of crops, (3) production of disease-free plants, and (4) rapid multiplication. The last mentioned application probably has the greatest significance to a commercial propagator.

The usual tissue culture procedure is to place a particular part of the plant on top of a gel containing specific nutrients, and new plants are formed. A typical gel may contain agar. All operations are performed under sterile conditions. As the plants grow in a gel, various organic compounds are produced which, if not removed, slow the growth and eventually kill the plantlets. Usually the plantlets are removed to another container with the same or different gel, depending upon the stage of plantlet development.

An increasingly popular procedure is to avoid using a gel and to instead use a liquid medium. Instead of transplanting the plantlets to another container, the liquid nutrient solution is changed. Ideally, the nutrient solution is less than 0.5 mm deep at the level where the plantlet grows. If the plantlet is totally immersed in the nutrient solution, it will die. The container in which the plantlets are grown has a filter on the top so there is gas exchange between the outside air and gases inside the container.

A problem in micropropagation by tissue culture techniques using liquid media is to maintain a fixed thin liquid level for the plantlets while the liquid level inside the container is continuously reduced.

Many schemes have been used to solve this problem. For example, using a filter paper wick to transfer the solution has been tried, but the transfer rate is too low. Liquid sprays from above have been tried, but this is expensive and a commercial apparatus has not yet been introduced.

Recently, "membrane rafts" have been used. The idea is to have a membrane contact the liquid solution at a fixed level so that a thin film of solution is maintained above the membrane. The membrane promotes uptake of nutrients dissolved in the liquid media while it maintains the growing tissue culture in a relatively dry environment. Liquid media as opposed to gel procedure avoids exudate buildup and nutrient-depletion zones. This allows for greater media composition flexibility with the objective of making the entire growth process faster, easier, and more productive.

However, with the membrane raft system, everything works well until the plantlets' weight increases sufficiently that the raft sinks. One manufacturer has solved the problem by providing floats of various buoyancies, and as the plantlets increase in weight, one float is removed and a different float is placed under the membrane. The floats are available from one manufacturer in the following buoyancies: 0–5 grams, 0–10 grams, and 10–25 grams. As a further problem, if one corner of the raft has a relatively higher plantlet weight, that corner of the raft sinks lower than the other three corners. It is also rather difficult to increase the area of the raft/membrane system economically.

The present invention provides a process for improving micropropagation of plant material in liquid media. The process, among other improvements, overcomes the disadvantages of the membrane raft approach to micropropagation.

SUMMARY OF THE INVENTION

Briefly, one embodiment of this invention provides a micropropagation process of growing plantlets in liquid media inside a container under sterile conditions. The process includes the step of placing a rigid capillary block inside the container in which the capillary block has a support region with upper and lower sides and a plurality of narrow diameter capillary holes extending through and opening to the upper and lower sides of the support region of the capillary block. A liquid-absorbing plant growth sheet is placed on the upper surface of the capillary block in contact with the capillary holes. A portion of the capillary block is immersed in a liquid nutrient-containing solution at a level in the container above the bottom surface of the support region of the capillary block. The capillary holes cause the liquid solution to travel by capillary action through the capillary holes continuously over time to consistently moisten the plant growth sheet and to thereby propagate micropropagateable plant material placed in contact with the sheet.

During use, as the level of the liquid solution in the container is drawn down due to the capillary action, thereby producing continuous wetting of the plant growth sheet, the liquid solution in the container can be replenished with a different or the same nutrient-containing material.

In one embodiment, a surfactant or other surface tension reducing medium is added to the solution in the container for enhancing the capillary action.

The invention provides improved growth rates and enhanced multiplication factors, while avoiding the change of buoyancy problems associated with the membrane raft approach. The invention also is more adaptable to increasing the area of the growth system economically to provide mass propagation of large numbers of clonal plants in a short time period, particularly when compared with the membrane raft process.

These and other aspects of the invention will be more fully understood by referring to the following detailed description and accompanying drawings.

BRIEF DESCRIPTION OF THE DRAWINGS

FIG. 1 is a cross-sectional view illustrating a membrane raft technique for micropropagation for plant material according to the prior art.

FIG. 2 is a cross-sectional view illustrating a micropropagation process according to principles of this invention.

FIG. 3 is a side elevational view showing a capillary block used in the process of this invention.

FIG. 4 is a top elevational view taken on line 4—4 of FIG. 3.

FIG. 5 is a bottom elevational view taken on line 5—5 of FIG. 3.

DETAILED DESCRIPTION

The present invention provides an improvement over the prior art membrane raft system of micropropagation illustrated in FIG. 1. The prior art membrane raft system illustrated in FIG. 1 is a type of interfacial membrane raft system marketed by Osmotek Ltd. (Rehovot 76120, Israel) under the mark LifeRaft. The interfacial membrane raft 10 floats on a liquid nutrient-containing solution 12 in a sterile closed container 14. A lid 15 with a small filter covers the top of the container. The filter paper is porous to gas to maintain a sterile environment inside the container. The interfacial raft has a shallow rectangular outer wall 16 of uniform height extending around the outer periphery of a rectangular interfacial membrane 18 covering the bottom of the raft. The plantlets 20 grow by micropropagation techniques and are shown growing on the interfacial membrane 18. Beneath the raft is a float comprising a thin, flat upper support surface 24 holding a float structure 26 extending below and around the outer periphery of the support 24. The membrane raft rests on the support surface and the float structure beneath it makes the float more buoyant than the raft and its contents. When the membrane 18 touches the liquid surface, opposing forces are created in the area inside the floats and below the membrane. The interfacial tension acting downwardly can act as a spring, maintaining the liquid/membrane contact, while the float's excess buoyancy lifts the raft upward. This balance of forces stretches the surface of the solution upward at 28, causing the raft to float above the surrounding liquid's surface. The growing plants 20 pump fluid up through the membrane, increasing raft weight and lessening the amount of stretch. For higher plant weights, a more buoyant float is substituted.

An advantage of using the membrane raft micropropagation technique is its use of liquid media which remains essentially homogeneous during growth. In a solid growth media, such as a gel-type material used in the prior art, diffusion rates are slow and exudate can build up near the base which can poison the culture. In addition, nutrient-depletion zones develop which further slows growth rates.

However, and as mentioned previously, a disadvantage of the buoyant interfacial membrane system is its need for floats of varying buoyancies to compensate for changes in weight as the plantlets increase in their growth. Non-uniformities in buoyancy also can be produced if there is a non-uniformity in the weight distribution of the plants grown on the membrane. The system also is not readily adaptable to large area mass micropropagation.

These disadvantages are solved by the present invention illustrated in FIGS. 2 through 5. In the process of this invention, plantlets are grown on a rigid capillary block 30. The support block 30 comprises of a rectangular piece of hard plastic having a horizontally extending support region 31 with flat, parallel upper and lower surfaces 32 and 34. A plurality of feet 36 preferably in the four corners of the block extend to a uniform level spaced below the lower surface 34 of the support region 31. A plurality of vertically extending narrow diameter capillary holes 38 are drilled parallel to each other in a desired pattern through the support region 31 of the block. The capillary holes 38 are preferably uniformly spaced apart, of uniform narrow diameter from top to bottom, and they open through the upper and lower surfaces of the block support region. In the illustrated embodiment, the capillary holes are drilled on a square pattern equidistantly spaced apart in uniformly spaced apart rows and columns of holes as best illustrated in FIGS. 4 and 5. Alternatively, a pattern of five capillary holes, four near the corners and one in the middle, can be used on a capillary block of the same size. The capillary block is preferably made of a polycarbonate material having a high melt temperature to facilitate drilling the narrow diameter capillary holes.

In a preferred embodiment, the block shown in FIGS. 2 through 5 has a thickness of about 13 mm in the support region 31, the four feet are about 6 mm high in the four corners of the block, the capillary holes are drilled to a diameter of one mm, and the holes are spaced apart about 18 mm from each other.

In use, the block is placed in a closed container 40 which is preferably rectangular shape and has a rectangular outer wall that supports a lid 42 with a small filter at its top. The filter is porous to gas to maintain a sterile environment inside the container. A thin, flat liquid-absorbing plant growth sheet 42 is placed on the upper surface 32 of the capillary block. The sheet 42 can be any hydrophilic material in the thin sheet form capable of absorbing liquid transferred to it by capillary action that propagates plant material by tissue culture techniques. The capillary block is placed in the container so that feet 36 below the block position the support region 31 with the lower surface 34 spaced uniformly above the floor of the container. A liquid nutrient-containing solution 44 is poured into the container within about 3 mm from below the upper surface 32 of the block. During use, and by capillary action, the liquid is drawn up through the capillary holes constantly over time so as to constantly moisten the plant growth sheet 42 even though the liquid level in the container may drop by as much as 5 mm. The wetted condition of the paper spreads reasonably uniformly across its surface. The solution can be replenished with the same or a different nutrient composition. A surfactant is preferably added to the liquid in order to reduce the surface tension of the liquid. Micropropagateable plant materials such as seeds or meristems placed on the sheet 42 are constantly provided with the nutrient-containing liquid drawn up to the membrane by capillary action, and the plantlets 46 continue to propagate.

Multiple systems of capillary blocks can be positioned modularly to form any desired surface area for use in mass propagation of plant material.

EXAMPLE

A tissue culture propagation arrangement as illustrated in FIGS. 2 through 5 was produced as a laboratory experiment. The hydrophilic sheet used in this experiment was a cellulose towel (paper) placed on top of the capillary block. Seeds of lettuce, cabbage, and zinnia were planted on the liquid-absorbing paper sheet. A surfactant was added to the nutrient-containing liquid contained at a level a few millimeters below the top surface of the capillary block. The liquid solution was drawn up through the capillary holes by capillary action and constantly maintained the paper sheet in a reasonably uniform wet condition across the surface of the paper sheet. Within two days all of the seeds had sprouted. At two and a half days all seedlings had green leaves.

What is claimed is:

1. A capillary block for use in the micropropagation of plant material comprising a unitary piece of a rigid material having a generally flat upper surface, a lower surface spaced below the upper surface, one or more feet projecting below the lower surface for positioning the capillary block on a capillary block-supporting surface of a container in which the capillary block is positioned with said lower surface elevated above said capillary-block supporting surface, and a plurality of narrow diameter capillary holes extending through the capillary block and opening to the upper and lower surfaces thereof, the capillary holes having a size and shape sufficient to draw a liquid medium from a level above the block's lower surface by capillary action to the upper surface thereof to thereby continuously moisten a thin liquid-absorbing plant growth-enhancing sheet resting on the upper surface of the block in contact with the capillary holes to thereby promote growth of plant material contacting the plant growth-enhancing sheet.

2. Apparatus according to claim 1 in which the plant growth enhancing sheet comprises a filter paper.

3. Apparatus according to claim 1 in which the plant material comprises seeds placed on the plant growth-enhancing sheet for growing into plantlets.

4. Apparatus according to claim 1 in which the container holds a plurality of modularly positioned capillary blocks each providing capillary action for continuously moistening a plant growth enhancing sheet resting on the capillary blocks.

* * * * *